ns Patent [19]

United States Patent [19]
Henrick et al.

[11] 3,818,049
[45] June 18, 1974

[54] SYNTHESIS OF CODLING MOTH ATTRACTANT

[75] Inventors: Clive A. Henrick; John B. Siddall, both of Palo Alto, Calif.

[73] Assignee: Zoecon Corporation, Palo Alto, Calif.

[22] Filed: July 26, 1971

[21] Appl. No.: 164,876

[52] U.S. Cl............ 260/345.9, 260/347.8, 260/456, 260/611 A, 260/615 R, 260/632 R
[51] Int. Cl..... C07d 7/04, C07d 5/04, C07c 43/14, C07c 43/20
[58] Field of Search.......... 260/345.9, 347.8, 611 A, 260/615 R

[56] References Cited
OTHER PUBLICATIONS

Kharasch & Reinmuth, Grignard Reactions of Nonmetallic Substances, (1954) page 265.

*Primary Examiner*—Norma S. Milestone
*Attorney, Agent, or Firm*—Donald W. Erickson; Lee-Louise H. Priest

[57] ABSTRACT

Sterospecific synthesis of an attractant for the codling moth by reacting sorbic aldehyde with an organometallic reagent to yield an 1-ether of trans-8-trans-10-dodecadiene-1.7-diol which is reduced via a 7-sulfonic acid ester to yield an ether of trans-8-trans-10-dodecadiene-1-ol and hydrolyzed to trans-8-trans-10-dodecadien-1-ol.

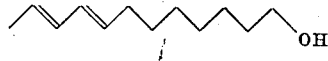

2 Claims, No Drawings

SYNTHESIS OF CODLING MOTH ATTRACTANT

BACKGROUND OF THE INVENTION

The present invention relates to the synthesis of trans-8-trans-10-dodecadien-1-ol, an attractant of the codling moth. This moth, Carpocapsa pomonella, is a worldwide pest of apples. The identification of this attractant of the codling moth has been reported in *Chemical & Engineering News*, 37, Dec. 21, 1970.

It is an object of the present invention to provide a synthesis for the preparation of trans-8-trans-10-dodecadien-1-ol and key intermediates therefor which uses readily available starting materials and is economical to practice. The compound can be used as an attractant for the monitoring, through selective trapping, of insect populations. Population counts thus obtained are used in determining the frequency and quantity of spray of insecticide or other insect control agent. The compound can also be used for the direct control of insect populations as by mass trapping. Other objects and advantages will become apparent as the invention is hereinafter described in detail.

SUMMARY OF THE INVENTION

In the practice of the invention, there is first prepared the C-1 ether of trans-8-trans-10-dodecadiene-1,7-diol(III) which may be outlined as follows:

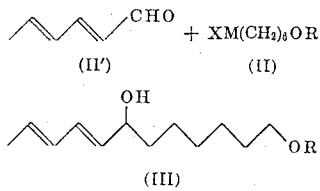

In the above formula, R represents a base stable group such as tetrahydropyran-2-yl, tetrahydrofuran-2-yl, t-butyl, benzyl, trityl, and the like protective groups which are conventionally employed in organo-metallic reactions such as Grignard reactions and which are stable under basic reaction conditions. X represents chloro or bromo and M represents a metal such as lithium, magnesium or zinc.

The ether (III), a key intermediate, is prepared in accordance with the present invention by reacting trans sorbic aldehyde (2,4-hexadien-1-al) with an organo-metallic agent.

As starting materials one may use either 1,6-hexamethyl enediol or 6-halohexan-1-ol, both of which are commercially available. If 1,6-hexamethylenediol is used it is selectively halogenated to yield 6-halohexan-1-ol, where the halogen is chlorine or bromine. Selective halogenation may be carried out by heating the alcohol with a concentrated aqueous halogen acid or with a phosphorus trihalide. The reaction is catalyzed by the addition of sulfuric acid and the reaction of HCl may be assisted by the addition of zinc chloride. An organic solvent medium inert to the reaction such as aliphatic or aromatic hydrocarbons and the like, e.g., heptane, pentane, benzene, toluene and the like is used.

The 6-halohexan-1-ol compound is then reacted with a base stable reagent to form a base stable protective group as illustrated in the following equation:

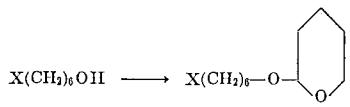

The hydroxyl group of the 6-halohexan-1-ol is protected during the subsequent reaction with an organo-metallic reagent by an base stable group. Aliphatic alcohols require protective groups of special types which can be later cleaved under mild conditions. Methyl ether derivaties often used with aromatic alcohols are usually not suitable as protective groups for aliphatic alcohols because the more drastic conditions required for cleavage lead to secondary changes. Several types of base stable groups are suitable, viz, ethers such as tetrahydropyran-2-yl, tetrahydrofuran-2-yl, t-butyl and the like. Tetrahydropyran-2-yl and tetrahydrofuran-2-yl ethers may be prepared by the reaction of the alcohol with dihydropyran and dihydrofuran, respectively, under acid catalysis. This preparation has been reported by Green, et al., *J. Med. Chem.* 10, 533 (1967). The t-butyl ether can be prepared by treating the alcohol with isobutene in the presence of sulfuric acid. These ethers are stable to base, to Grignard reagents, and to oxidation; and the original alcohol can be recovered by gentle hydrolysis.

The organo-metallic reagent (II) is prepared from 2-[(6-halohexyl)oxy] tetrahydropyran or other suitable protective ether by reaction with a reasonably active metal such as lithium, magnesium or zinc. Magnesium, the preferred metal, may either be in the form of thin turnings or granules. The reaction takes place in an anhydrous ethereal solution. The ethereal solution must be absolutely dry as a trace of water may prevent the reaction from starting. Suitable ethers include both linear and cyclic ethers such as diethyl ether, di-n-butyl ether, tetrahydrofuran, and the like.

The reaction of sorbic aldehyde (II') with the organo-metallic reagent (II) occurs vigorously. The organo-metallic reagent is kept under an inert atmosphere such as nitrogen, helium, argon or the like and is cooled to about 0°C. A solution of sorbic aldehyde in an organic solvent medium inert to the reaction is added dropwise at such a rate that refluxing is kept under control. Preferably the solution is cooled in an ice-bath to maintain temperature about 0°C. Suitable solvents include both linear and cyclic ethers such as diethyl ether, tetrahydrofuran, and the like and hydrocarbons such as pentane, hexane, heptane and the like. After the sorbic aldehyde solution has been added the reaction mixture is stirred for several hours at about room temperature.

The organo-metallic complex formed by the reaction of sorbic aldehyde (II') and the organo-metallic reagent (II) is decomposed under neutral or basic conditions such as by the addition of a saturated ammonium chloride solution to yield the alcohol-ether (III). Hydrolysis of the organo-metallic complex with saturated ammonium chloride solution possesses the advantage that the resulting solution of the alcohol is neutral. This is important in the instant synthesis since the presence of acid could dehydrate the 7-alcohol or prematurely hydrolyze the base stable protecting group. As the reaction of the organo-metallic complex with saturated ammonium chloride solution may be exothermic, it is desirable to cool the reaction mixture to room temperature or lower and add the saturated ammonium chloride solution slowly with stirring. The reaction product (III), a trans-8-trans-10-dodecadien-7-ol ether, is isolated by filtering off the precipitate and removing the solvent from the filtrate under reduced pressure. Decomposition of the organo-metallic complex under neutral or basic conditions can be accomplished using water or a dilute or saturated solution of ammonium salts, sodium salts, potassium salts, and the like, e.g., dilute aqueous ammonium chloride, saturated or dilute aqueous sodium sulfate, dilute aqueous sodium hydroxide, dilute aqueous potassium hydroxide, and the like.

In the practice of the invention there is then prepared the ether (IV) of trans-8-trans-10-dodecadien-1-ol which may be outlined as follows:

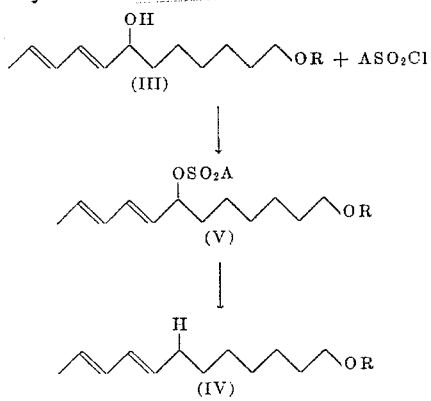

In the above formula, R represents a base stable group and A represents an alkyl or aryl group such as methyl, toluene or a toluene derivative.

The ether (IV), a key intermediate, is prepared in accordance with the present invention by reacting a trans-8-trans-10-dodecadien-7-ol ether with an acid chloride of an alkyl or arylsulfonic acid followed by reduction of the resultant sulfonic acid ester. Suitable acid chlorides include methanesulfonyl chloride (usually identified by the abbreviation mesyl chloride), p-toluenesulfonyl chloride (usually identified by the abbreviation tosyl chloride), p-bromotoluenesulfonyl chloride (usually identified by the abbreviation brosyl chloride), and the like. The sulfonic acid esters thus prepared (V) are usually identified by the abbreviations mesylates, tosylates, brosylates, and the like. A facile synthesis of mesylates has been reported by Crossland, et al., *J. Org. Chem.* 35, 3195 (1970). Although these sulfonic acid esters can be prepared by the reaction of the alcohol with a suitable acid chloride in anhydrous pyridine at room temperature, the Crossland et al. synthesis is preferred because it avoids possible side reactions between the sulfonic acid esters produced and the solvent, pyridine. The synthesis reported by Crossland et al. deviates from the usual procedure by the use of triethylamine as a base and methylene chloride as solvent. In the preferred practice of the present invention sulfonic acid esters are prepared using triethylamine as a base and either an ether such as diethyl ether, dipropyl ether, and the like or a hydrocarbon such as pentane, hexane, heptane, and the like, as a solvent.

The sulfonic acid esters (V) formed in the practice of the present invention are very reactive and it is therefore important that the reactants and product be well chilled. The temperature of the ester, in the preferred practice of the invention, should not be above about 5°C. A trans-8-trans-10-dodecadien-7-ol ether (III) is dissolved in an anhydrous inert solvent chosen from the solvents discussed above under an inert atmosphere such as helium, argon or the like. The solution is cooled to 0° to −78°C and triethylamine is added with stirring. A sulfonic acid chloride such as mesyl chloride is added dropwise with stirring. Stirring may be continued for several hours.

Instead of isolating the sulfonic acid ester it is preferable to prepare the ether (IV) by reduction of the sulfonic acid ester (V) in solution. Reduction of the sulfonic acid ester (V) completes the reductive elimination of the hydroxyl group of the secondary alcohol (III). Sodium amalgam is the classical reducing agent, however in the practice of the present invention lithium aluminum hydride or sodium bis(2-methoxyethoxy) aluminum hydride are preferred. The sulfonic acid ester (V) is maintained at a temperature below 0°C. and preferably about −20°C. Mesylates are quite useful as synthetic intermediates in this reaction because the mesylate fragment reduces to methyl mercaptan, which is easily removed. An excess of reducing agent is added dropwise with stirring. After the reducing agent is added the reaction mixture may be allowed to warm gradually to room temperature with stirring to insure complete reaction. Following complete reduction the reaction mixture is treated with aqueous ammonium chloride to quench any excess reducing agent remaining in the reaction mixture. The product ether (IV) is isolated from the reaction mixture as a colorless oil.

In the final step of the practice of the present invention the ether (IV) is hydrolyzed to remove the base stable protective group denoted R in compounds (II) and (III). As previously discussed the base stable protective groups can be split under mild conditions. Thus

the attractant of the codling moth (I) can be recovered by gentle hydrolysis of ether (IV) with dilute mineral acids or organic acids such as acetic acid, p-toluenesulfonic acid, and the like.

The following examples are provided to illustrate the present invention. All temperatures are in degrees Centigrade.

EXAMPLE 1

To 25 g. Mg turnings add 1 g. of I₂ and heat to activate. After cooling add 750 ml. diethyl ether with stirring.

To the above prepared solution is added 100 g. of 2-[(6'-chlorohexyl)oxy] tetrahydropyran in 125 ml. diethyl ether. Heat to gentle reflux and stir vigorously until Gilman Test indicates reaction has started. Add another 100 g. of 2-[(6'-chlorohexyl)oxy] tetrahydropyran in 125 ml. ether with stirring. Add 5 g. Mg and another 12.4 g. of 2-[(6'-chlorohexyl)oxy] tetrahydropyran in 100 ml. tetrahydrofuran with continued refluxing. Stir overnight at room temperature to yield the Grignard.

EXAMPLE 2

The solution of the Grignard of Example 1 is cooled to 0° under nitrogen. To this solution is added a total of 80 g. all-trans sorbic aldehyde in tetrahydrofuran dropwise with stirring, maintaining the temperature at 0° until the addition is complete. The mixture is allowed to rise to room temperature and stand for about 2 hours. Then 150 ml. of a saturated aqueous ammonium chloride solution is added dropwise with stirring while cooling in an ice-bath. A dense white precipitate forms and settles to the bottom of the reaction vessel. The reaction mixture is decanted and precipitate washed with ether. The filtrate is washed with saturated aqueous sodium bicarbonate and dried with calcium sulfate, filtered and the solvent is removed under reduced pressure to yield 1-(tetrahydropyran-2'-yloxy)-trans-8-trans-10-dodecadien-7-ol.

EXAMPLE 3

To a solution of 2 g. of the ether of Example 2 in 15 ml. absolute diethyl ether under an argon atmosphere cooled to −20° add 1.2 ml. triethylamine with stirring. Stir and add 0.60 ml. mesyl chloride dropwise at −20°. Allow the reaction mixture to stand at −20° for 2 hours to yield the 7-mesylate (V).

EXAMPLE 4

To the above solution of the 7-mesylate (V) of Example 3, at −20° is added 2 ml. of LiAlH$_4$ in ether (Foote, 3.9M). Allow the reaction mixture to rise to room temperature and stir overnight. Add 2 ml. H$_2$O dropwise (care should be taken as hydrogen is evolved) and pour the reaction mixture into an aqueous ammonium chloride solution. Extract with diethyl ether and wash with H$_2$O and NaCl. Dry with CaSO$_4$ to yield 1-(tetrahydropyran-2'-yloxy)-trans-8-trans-10-dodecadiene (IV), a colorless oil with an odor of methyl mercaptan.

EXAMPLE 5

One gram of the ether (IV) of Example 4 is refluxed with 50 ml. methanol, 10 ml. water and 0.3 g. p-toluenesulfonic acid for 1 hour. Most of the methanol is removed under reduced pressure. The reaction mixture is extracted with diethyl ether and washed with water and brine and dried with calcium sulfate to yield trans-8-trans-10-dodecadien-1-ol(I), an oil, which can be purified by distillation or chromatography.

EXAMPLE 6

To a solution of 127.19 g. of 1-(tetrahydropyron-2'-yloxy)-trans-8-trans-10-dodecodien-7-ol in 450 ml. absolute diethyl ether under a nitrogen atmosphere cooled to −50° add 72.1 ml. of triethylamine with stirring. Stir and add 37.2 ml. mesyl chloride at −47°. Allow the reaction mixture to warm to −18° to yield the respective 7-mesylate.

EXAMPLE 7

To a solution of the 7-mesylate of Example 6 at −40° is added dropwise 127 ml. of LiAlH$_4$ (3.9M) in ether. Allow the reaction mixture to rise to room temperature and stir overnight. To the reaction mixture add 70 ml. of aqueous ammonium chloride solution, taking care as hydrogen is initially evolved. Then 500 ml. dry diethyl ether is added and mixture refluxed gently for one-half hour. A granular white precipitate forms which is separated and washed with diethyl ether. The filtrate is dried with calcium sulfate and concentrated under reduced pressure to yield 1-(tetrahydropyran-2'-yloxy)-trans-8-trans-10-dodecadiene.

EXAMPLE 8

117 g. of the ether of Example 7 is refluxed with 500 ml. ethanol, 50 ml. water and 15 g. of p-toluenesulfonic acid for 3 hours to yield (I) which is worked up as in Example 5.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A compound of the following formula:

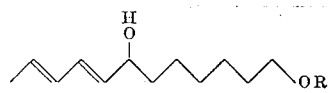

wherein,

R is tetrahydropyran-2-yl, tetrahydrofuran-2-yl, t-butyl, benzyl or trityl; said compound having a trans-8,trans-10 isomeric configuration.

2. A compound according to claim 1 wherein R is tetrahydropyran-2-yl or tetrahydrofuran-2-yl.

* * * * *